United States Patent
Shimizu et al.

[19]

[11] Patent Number: 5,937,735
[45] Date of Patent: Aug. 17, 1999

[54] SWASH-PLATE COMPRESSOR HAVING A THRUST RACE WITH A RADIAL FLANGE INSURING SUPPLY OF A LUBRICATING OIL TO A DRIVE SHAFT BEARING

[75] Inventors: Shigemi Shimizu, Sawa-gun; Shinji Nakamura, Isesaki, both of Japan

[73] Assignee: Sanden Corporation, Gunma, Japan

[21] Appl. No.: 08/989,236

[22] Filed: Dec. 12, 1997

[30] Foreign Application Priority Data

Dec. 12, 1996 [JP] Japan .................................. 8-331899

[51] Int. Cl.⁶ .................................................... F01B 31/10
[52] U.S. Cl. ............................................. 92/153; 92/12.2
[58] Field of Search .............................. 92/12.2, 70, 71, 92/153

[56] References Cited

U.S. PATENT DOCUMENTS

| | | |
|---|---|---|
| 307,334 | 10/1884 | Richards . |
| 1,369,592 | 2/1921 | White . |
| 1,565,299 | 12/1925 | Wenzel . |
| 1,581,312 | 4/1926 | Fryoux et al. . |
| 1,714,145 | 5/1929 | Sperry . |
| 1,760,122 | 5/1930 | Drevitson . |
| 1,803,309 | 4/1931 | Budlong . |
| 1,815,354 | 7/1931 | Ring . |
| 2,262,311 | 11/1941 | Zahodiakin . |
| 2,821,932 | 2/1958 | Lucien . |
| 3,408,123 | 10/1968 | Zwicky . |
| 3,920,254 | 11/1975 | Johnston et al. . |
| 4,005,948 | 2/1977 | Hiraga et al. ............................ 417/269 |
| 4,042,309 | 8/1977 | Hiraga . |
| 4,236,878 | 12/1980 | Terauchi .................................. 417/269 |
| 4,526,516 | 7/1985 | Swain et al. ......................... 91/12.2 X |
| 4,546,692 | 10/1985 | Lotter et al. . |
| 4,641,570 | 2/1987 | Futumura et al. .................... 91/153 X |
| 4,681,326 | 7/1987 | Kubo . |
| 4,763,563 | 8/1988 | Ikeda et al. . |
| 4,781,539 | 11/1988 | Ikeda et al. ............................. 92/71 X |
| 4,835,856 | 6/1989 | Azami . |
| 4,964,741 | 10/1990 | Gaerte . |
| 5,169,162 | 12/1992 | Azami et al. . |
| 5,231,914 | 8/1993 | Hayase et al. ........................... 92/12.2 |
| 5,370,505 | 12/1994 | Takenaka et al. ..................... 92/153 X |
| 5,393,204 | 2/1995 | Kawahara .............................. 91/499 X |
| 5,495,789 | 3/1996 | Ogura et al. ................................ 92/71 |
| 5,644,970 | 7/1997 | Michiyuki et al. ..................... 92/71 X |
| 5,647,266 | 7/1997 | Claas ........................................... 92/71 |
| 5,772,406 | 6/1998 | Takai . |
| 5,839,347 | 11/1998 | Nomura et al. .......................... 92/12.2 |

FOREIGN PATENT DOCUMENTS

| | | |
|---|---|---|
| 613959 | 2/1961 | Canada . |
| 0554791 | 2/1993 | European Pat. Off. . |
| 19614384 | 4/1996 | Germany . |
| 19635738 | 9/1996 | Germany . |
| 58-206888 | 12/1983 | Japan ...................................... 92/153 |
| 314865 | 6/1929 | United Kingdom . |

*Primary Examiner*—John E. Ryznic
*Attorney, Agent, or Firm*—Baker & Bott, L.L.P.

[57] ABSTRACT

A front housing (20) has a shaft hole (210) and an oil path (20a) communicating with a crank chamber (15) and the shaft hole to lubricate a bearing supporting a drive shaft (3) and and a shaft seal contained in the shaft hole. A lubricating oil in the crank chamber (15) is scraped by the rotation of the drive shaft (3). An oil trap (19) is formed at one end of the oil path (20a) to effectively collect the lubricating oil which is supplied through the oil path (20a) to the shaft hole (210). The oil trap (19) is formed by a part of a first thrust race (201b) and an oil receiving groove (20g). The first thrust race (201b) has a plurality of finger portions (201d) bent towards a bottom surface of an annular groove (204) formed in an internal wall surface of the front housing (20). The annular groove (204) has a plurality of fitting holes (20h) for receiving the finger portions (201d) therein in one-to-one correspondence. The finger portions (201d) are fitted into the fitting holes (20h) to thereby inhibit the rotation of the first thrust race (201b).

9 Claims, 4 Drawing Sheets

SWASH-PLATE COMPRESSOR HAVING A THRUST RACE WITH A RADIAL FLANGE INSURING SUPPLY OF A LUBRICATING OIL TO A DRIVE SHAFT BEARING

BACKGROUND OF THE INVENTION

This invention relates to a swash-plate compressor for use in, for example, an automobile air conditioner and, in particular, to a swash-plate compressor having an arrangement for supplying a lubricating oil to a bearing supporting a drive shaft.

A conventional swash-plate compressor of the type described comprises a compressor housing, a drive shaft extending from the outside to the inside of the compressor housing and rotatably supported by the compressor housing, a swash plate inclined in relation to the drive shaft and rotatable together with the drive shaft, and a plurality of pistons coupled to the swash plate so that the rotation of the swash plate together with the drive shaft is converted to reciprocating motion of the pistons along the drive shaft. The compressor housing comprises a cylinder housing having a front open end, a crank chamber, and a cylinder block adjacent the crank chamber, and a cylinder head mounted on the opposite end of the cylinder housing or on the opposite end of the cylinder block through a valve assembly. The cylinder block is provided with a plurality of cylinder bores in which the pistons are slidably fitted, respectively. The cylinder head is formed with a suction chamber connected to a inlet port and a discharge chamber connected to an outlet port.

Due to reciprocating motion of each of the pistons, working fluid such as a refrigerant is sucked into the corresponding one of the cylinder bores from the suction chamber through the valve assembly and compressed and discharged as a compressed gas into the discharge chamber through the valve assembly. The compressed gas is supplied to a refrigerant circuit connected to the outlet port.

The front housing has a shaft hole through which the drive shaft extends into the crank chamber. The drive shaft is rotatably supported by the front housing through a radial needle bearing mounted in the shaft hole. In the shaft hole, a shaft seal is also mounted on the drive shaft in front of the radial needle bearing so as to seal the crank chamber from the outside.

The drive shaft is also supported at is opposite ends by the cylinder block through a radial bearing.

A rotor is fixedly mounted on the drive shaft within the crank shaft and is coupled to the swash plate to rotate the swash plate together with the drive shaft. The rotor is supported on an inner surface of the front housing through a thrust needle bearing.

In the crank chamber, a lubricating oil is accumulated for lubricating moving parts of the compressor such as the bearings, coupling portions between the rotor and swash plate and between the swash plate and pistons, pistons, cylinder bores, and others. The lubricating oil is carried up by the swash plate and rotor and then splashed onto the parts in the crank chamber and the inner surfaces of the cylinder housing and the front housing. The splashed oil flows on the parts and inner surfaces to perform the lubrication.

In order to effectively lubricate the radial needle bearing within the shaft hole, the front housing has an oil path to establish communication between the crank chamber and the shaft hole. The oil flows on the inner surface of the front housing flows into the shaft hole through the oil path. The oil then insures the seal between the drive shaft and the shaft seal and also lubricates the radial needle bearing. The oil then returns into the crank chamber through the shaft hole along the drive shaft. Then the oil further lubricate the thrust needle bearing and accumulated in the crank chamber.

In the swash-plate compressor of the above-mentioned structure, the lubricating oil flowing the inner surface of the front housing is splashed radially outward by centrifugal force resulting from the rotation of the rotor. Therefore, oil is insufficiently supplied into the shaft hole. As a result, the radial needle bearing suffers insufficient lubrication and the shaft seal is not reliable in sealability. This leads to a risk of occurrence of damage of the bearing and resultant gas leakage.

SUMMARY OF THE INVENTION

It is an object of this invention to provide a swash-plate compressor which has a simple and inexpensive lubricating structure to stably and reliably supply a lubricating oil to a radial bearing and a shaft seal.

According to this invention there is provided a swash-plate compressor comprising a compressor housing having a plurality of cylinder bores angularly spaced from each other about a axis and a crank chamber adjacent the cylinder bores, a drive shaft extending on the axis and rotatably supported by the compressor housing, a swash plate arranged within the crank chamber and attached to the drive shaft with an inclination angle to be rotated together with the drive shaft, a plurality of pistons slidably fitted in the cylinder bores, respectively, and a transmission member for converting a swinging motion of the swash plate into a linear reciprocal motion of the pistons, the compressor housing being provided with a shaft hole containing a radial bearing to rotatably support the drive shaft and an oil path communicating with the crank chamber and the shaft hole, a lubricating oil in the crank chamber being scraped by the rotation of the drive shaft and supplied through the oil path to the radial bearing, the compressor hosing being provided with an oil trapping means formed at an entrance of the oil path to receive the lubricating oil.

DESCRIPTION OF THE PREFERRED EMBODIMENTS

Figure 1:
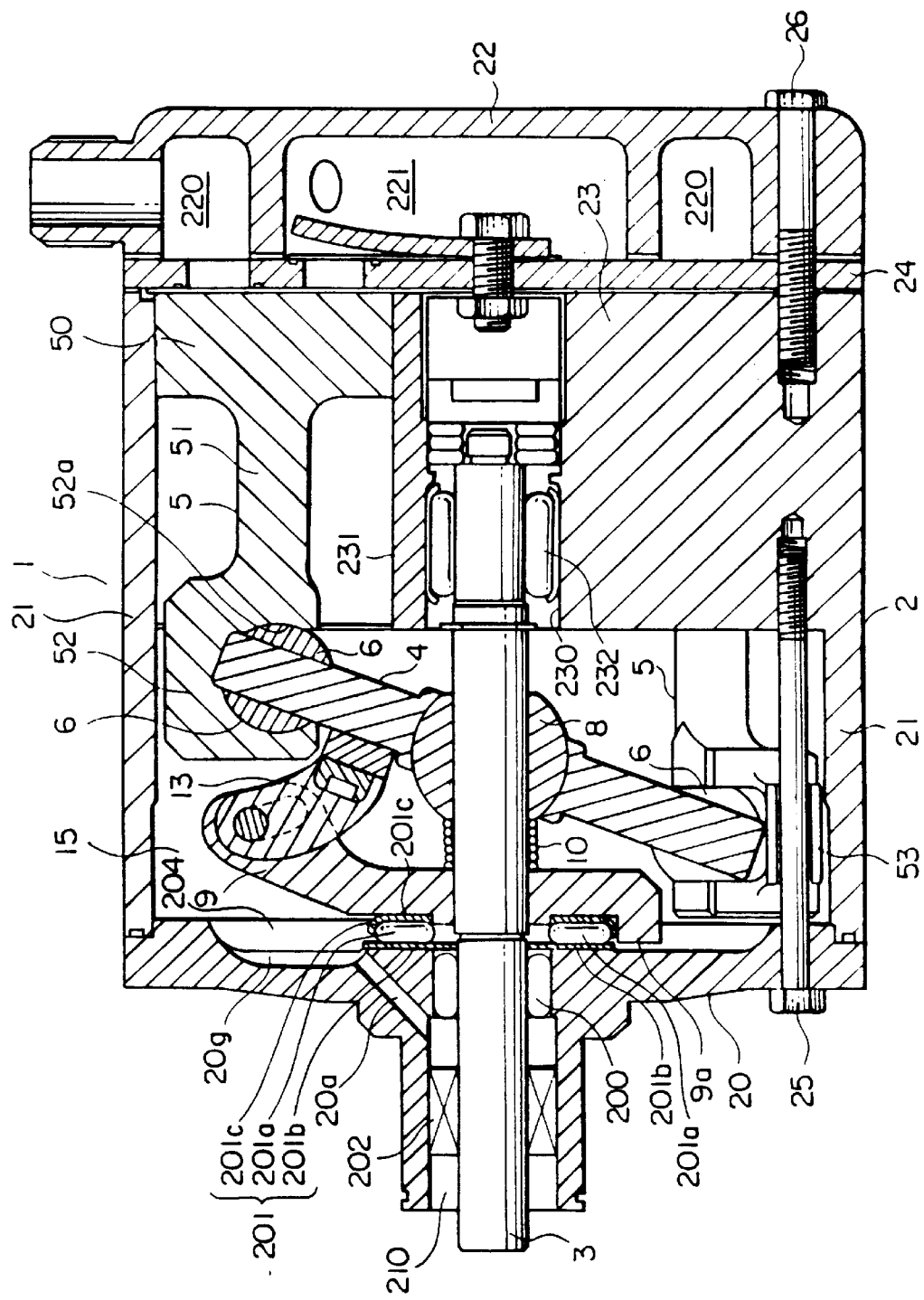
FIG. 1 is a vertical sectional view of a conventional swash-plate compressor.

In order to facilitate an understanding of this invention, a conventional swash-plate compressor will at first be described with reference to the drawing.

Referring to FIG. 1, the conventional swash-plate compressor 1 comprises a compressor housing 2, a drive shaft 3, a swash plate 4, a plurality of pistons 5, and a plurality of pairs of shoe members 6 of a generally semispherical shape.

The compressor housing 2 comprises a front housing 20 of a generally funnel-like shape, a housing body 21 or a cylinder housing of a generally cylindrical shape, and a cylinder head 22 of a generally cup-like shape.

The front housing 20 has a shaft hole 210 to permit penetration of the drive shaft 3, in which assembled are a first radial needle bearing 200, a thrust needle bearing unit 201, and a shaft seal unit 202. The shaft seal unit 202 and the first radial needle bearing 200 are arranged between an internal wall of the shaft hole 210 and the drive shaft 3.

The housing body 21 has one open end closed by the front housing 20, a crank chamber 15 continuous to the open end, and a cylinder block 23 adjacent to the crank chamber 15 on the opposite end of which the cylinder head 22 is mounted through a valve plate or valve assembly 24. The cylinder block 23 has a center hole 230 formed at its center and a plurality of cylinder bores 231 formed around the center hole 230. The drive shaft 3 is inserted in the center hole 230 of the cylinder block 23 and supported by a second radial needle bearing 232. The cylinder bores 231 are arranged at a peripheral portion of the cylinder block 23 with an equal space kept from one another in a circumferential direction to surround the center hole 230. The cylinder head 22 is provided with a suction chamber 220 and a discharge chamber 221.

The front housing 20 described above is fixed to the housing body 21 by a plurality of first bolts 25. The cylinder head 22 is fixed to the housing body 21 by a plurality of second bolts 26 through the valve plate 24.

Thus, the front housing 20, the housing body 21, and the cylinder head 22 are integrally fixed by the first and the second bolts 25 and 26 to one another to form the compressor housing 2. The first bolts 25 extend in parallel to center lines of the cylinder bores 231 in the vicinity of an inner peripheral wall surface of the housing body 21 and are inserted into the cylinder block 23 between adjacent ones of the cylinder bores 231.

The drive shaft 3 is rotatably supported by the front housing 20 and the cylinder block 23 through the first and the second radial needle bearings 200 and 232. The drive shaft 3 is located at the center of the housing 2. The drive shaft 3 has one end protruding outward from the shaft hole 210 of the front housing 20. To the above-mentioned one end of the drive shaft 3, driving force from a drive source such as an engine (not shown) is transmitted through an electro-magnetic clutch (not shown).

The swash plate 4 is coupled and hinged through the arm member 13 to the rotor 9 fixed to the drive shaft 3. Thus, the swash plate 4 is rotated together with the drive shaft 3.

A spherical bushing 8 is interposed between the swash plate 4 and the drive shaft 3. The spherical bushing 8 is attached to the drive shaft 3 to be movable in an axial direction of the drive shaft 3. Due to the presence of the movable spherical bushing 8 and hinge connection of the swash plate 4 to the rotor 9, the swash plate 4 is variable in inclination angle with respect to the drive shaft 3.

A coil spring 10 attached to the drive shaft 3 is interposed between the spherical bushing 8 and the rotor 9. The spherical bushing 8 and therefore the swash plate 4 are urged by the coil spring 10 in a direction such that the inclination angle of the swash plate 4 is reduced.

The rotor 9 is coupled at a peripheral portion to the swash plate 4 through an arm member 13 of the swash plate 4, as described above, and is provided with, at the opposite portion, a balancing member 9a. The rotor 9 is supported on the inner surface of the front housing by the thrust needle bearing unit 201. The bearing 201 comprises bearing elements 201a, a first thrust race 201b of a generally disk-like shape, and a second thrust race 201c of a generally disk-like shape.

The bearing elements 201a are interposed between the first and the second thrust races 201b and 201c. The first thrust race 201b is penetrated by the drive shaft 3 and located in contact with the inner surface of the front housing 20. The second thrust race 201c is mounted on a front end surface of the rotor 9.

The pistons 5 are fitted into the cylinder bores 231, respectively. Each of the pistons 5 comprises a piston portion 50, a rod portion 51, and a shoe receiving portion 52.

The piston portion 50 is slidably inserted into a corresponding one of the cylinder bores 231. The rod portion 51 connects the piston portion 50 with the shoe receiving portion 52. The shoe receiving portion 52 has a shoe receiving surface 52a in the form of a spherical recess.

One pair of shoe members 6 are slidable on the both side surfaces of a periphery of the swash plate 4, respectively, and are slidably mounted in the shoe receiving portion 52 to slidably clamp the swash plate 4. With this structure, a swinging motion of the swash plate 4 rotated together with the drive shaft 3 is converted into a linear reciprocal motion of the shoe receiving portion 52. As a consequence, the pistons 5 are made to perform linear reciprocal motion within the cylinder bores 231. By the reciprocal motion of the piston portion 50 within the cylinder bore 231, the refrigerant gas is sucked into the cylinder bore 231 through the valve plate 24 from the suction chamber 220, compressed therein, and discharged into the discharge chamber 221 through the valve plate 24.

In the crank chamber 15, a lubricating oil is accumulated for lubricating various moving parts of the compressor. The lubricating oil is scraped or carried up by the rotor 9 and the swash plate 4 rotating together with the drive shaft 3 and splashed onto various parts within the crank chamber 15 and the inner surface of the crank chamber. The oil flows on the various parts and the inner surface and lubricates the various parts.

The radial needle bearing 200 and the shaft seal unit 202 are not within the crank chamber 15. In order to effectively lubricate them, the front housing is provided with an oil path 20a for communication between the crank chamber 15 and the shaft hole 210. The oil flowing on the inner surface of the crank chamber 15 is supplied into the shaft hole 210 through the oil path 20a and lubricates the radial needle bearing 200 and the shaft seal unit 202.

The front housing 20 is formed with an annular groove 204 in the internal wall surface thereof, i.e., the internal wall surface of the crank chamber 15 around the shaft hole 210 so as to permit the rotor 9 to rotate without interference of the balancing member 90 and the internal wall surface of the front housing. In addition, the front housing 20 is provided with an oil receiving groove 20g formed in a bottom of the annular groove 204. Thus, the oil receiving groove 20g is located at a position radially outward from the first thrust race 201b. One end of the oil path 20a is located in the oil receiving groove 20g. Thus, the oil flows on the inner surface of the front housing and into the oil receiving groove 20g and then into the oil path 20a.

As described above, the rotor 9 has the balancing member 9a protruding into the annular groove 204. The balancing member 9a and the internal wall surface of the front housing 20 are close to each other. With this structure, the lubricating oil on the internal wall surface of the front housing 20 is splashed radially outward by the rotation of the rotor 9. Therefore, supply of the lubricating oil into the shaft hole 210 is insufficient. Thus, there are caused problems as described in the preamble of the instant specification.

Figure 2:
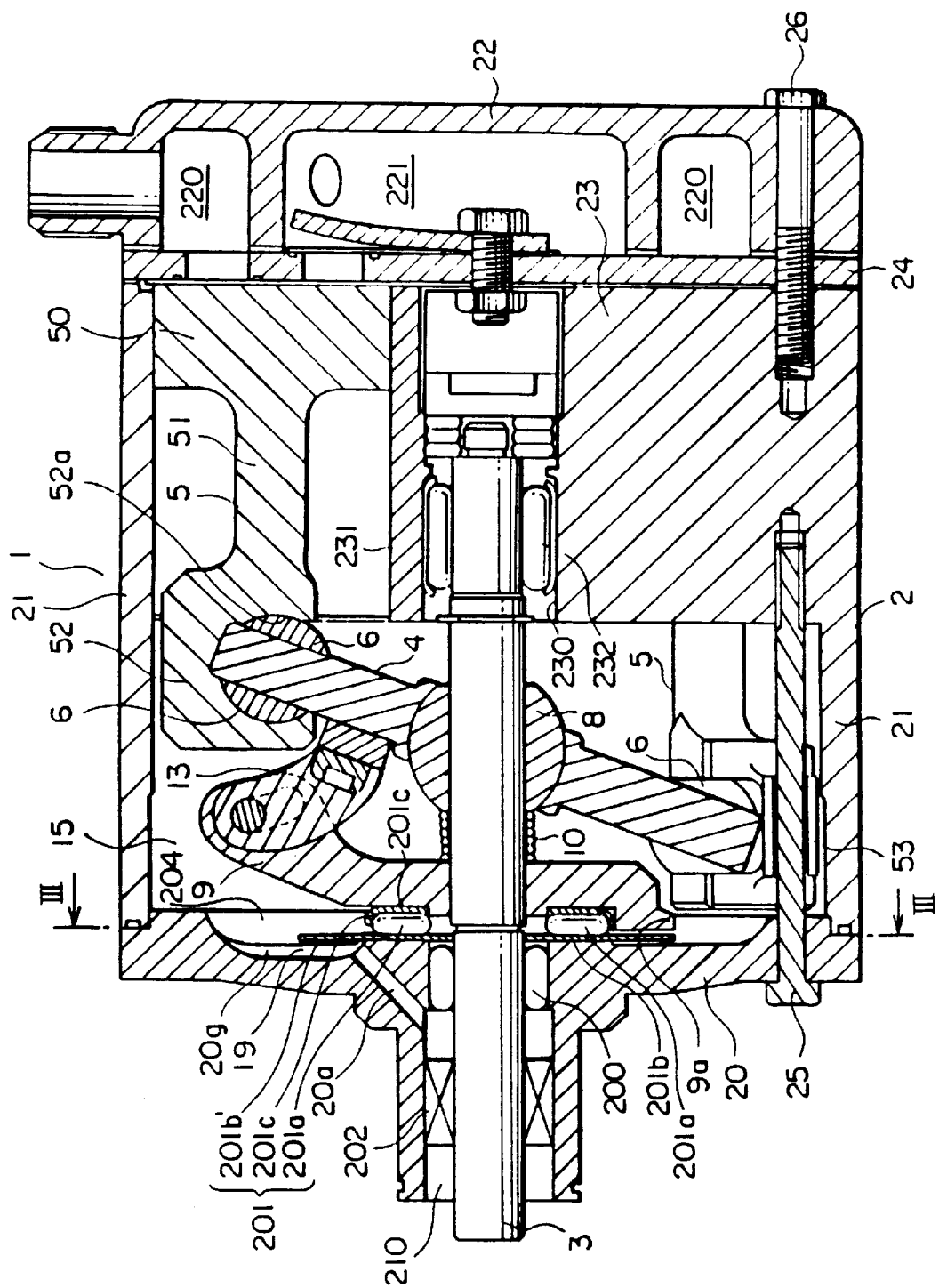
FIG. 2 is a vertical sectional view of a swash-plate compressor according to a first embodiment of this invention.
Figure 3:
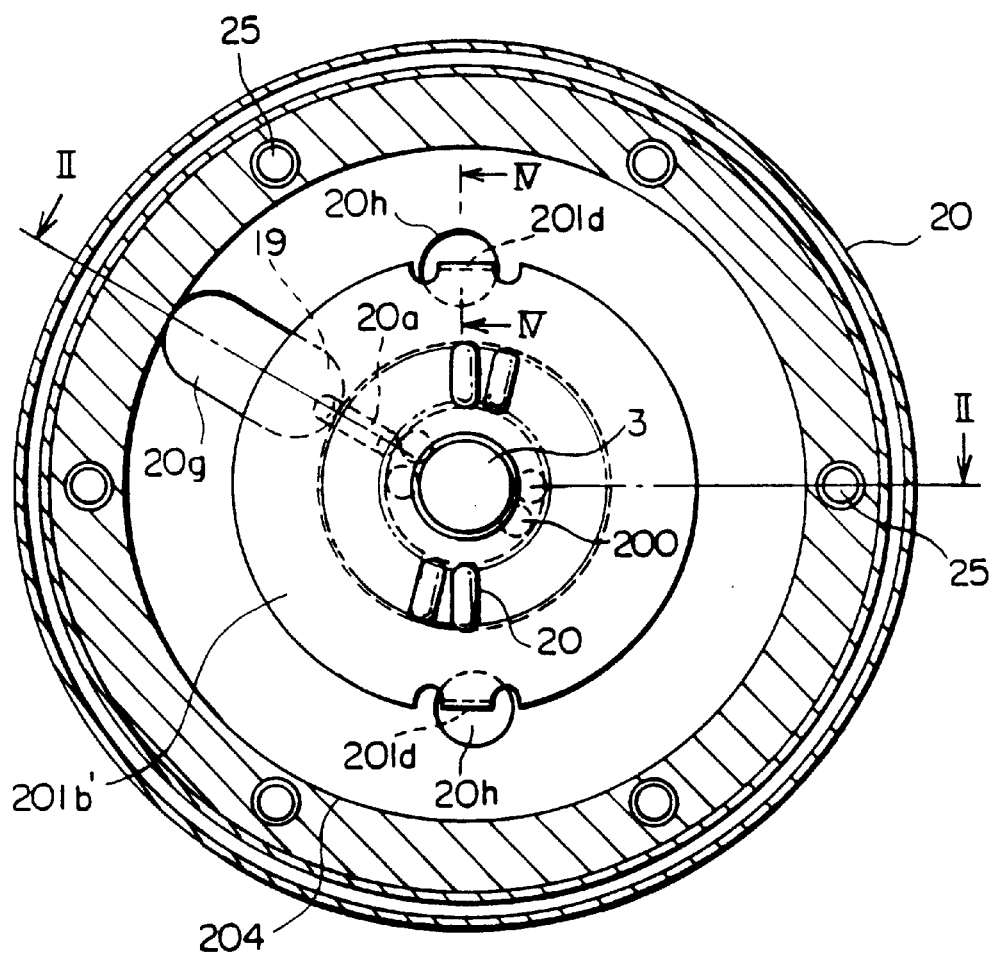
FIG. 3 is a sectional view taken along a line III—III in FIG. 2.
Figure 4:
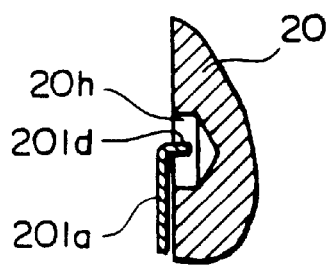
FIG. 4 is a sectional view taken along a line IV—IV in FIG. 3.

Referring to FIGS. 2 through 4, description will be made about a swash-plate compressor according to a first embodiment of this invention. It is noted here that FIG. 2 is a sectional view taken along a line II—II in FIG. 3. In the following description, similar parts to those described in conjunction with FIG. 1 are designated by like reference numerals and the following description will be directed only to characteristic parts of this embodiment.

In the embodiment shown in FIGS. 2 through 4, an oil trapping portion 19 is formed in the oil receiving groove 20g so as to insure the lubricating oil to flow into the oil path 20a. The oil trapping portion 19 is formed by a portion of the oil receiving groove 20g and a radially extended flange portion of the first thrust race 201b of the thrust needle bearing unit 201. Thus, the radially extended flange portion of the first thrust race 201b radially extends along the bottom surface of the annular groove 204 and over the portion of the oil receiving groove 20g. Thus, the oil trapping portion 19 is located at a radially inward or lower part of the oil receiving groove 20g. The radially extending flange portion has an extending size sufficient to extend to or beyond an outer edge of the balancing member 9a. The one end of the oil path 20a is opened in the oil trapping portion 19 of the oil receiving groove 20g. Therefore, the lubricating oil can be reliably trapped in the oil trapping portion 19 without being splashed by the centrifugal force of the rotor 9 and is insured to be supplied through the oil path 20a to a shaft hole 210. Thus, the shaft seal unit 202 and the radial needle bearing are reliably lubricated.

As illustrated in FIGS. 3 and 4, the first thrust race 201b has two finger portions 201d formed at its peripheral edge and bent towards the bottom surface of the annular groove 204.

Specifically, the finger portions 201d in this embodiment are located at two diametric opposite positions on the peripheral edge of the first thrust race 201b and are substantially perpendicularly bent with respect to a surface plane of the first thrust race 201b. Two fitting holes 20h are formed in the bottom surface of the annular groove 204 of the front housing 20 to receive the finger portions 201d therein, respectively. The finger portions 201d are fitted into the fitting holes 20h, respectively, to thereby inhibit the rotation of the first thrust race 201b.

Therefore, each of the finger portions 201d has a width smaller than a diameter of each of the fitting holes 20h. The length of the finger portion 201d from the surface plane of the first thrust race 201b to the top end of the finger portion 201d is smaller than a depth of the fitting hole 20h. Thus, each of the finger portions are loosely fitted into the fitting hole 20h.

In this embodiment, the first thrust race 201b is extended in a radial direction over its entire periphery.

Alternatively, the first thrust race 201b may be partially protruded in the radial direction so as to partially cover the oil receiving groove 20g. Such modification will hereafter be described as a second embodiment, with reference to FIGS. 5 and 6.

Figure 5:
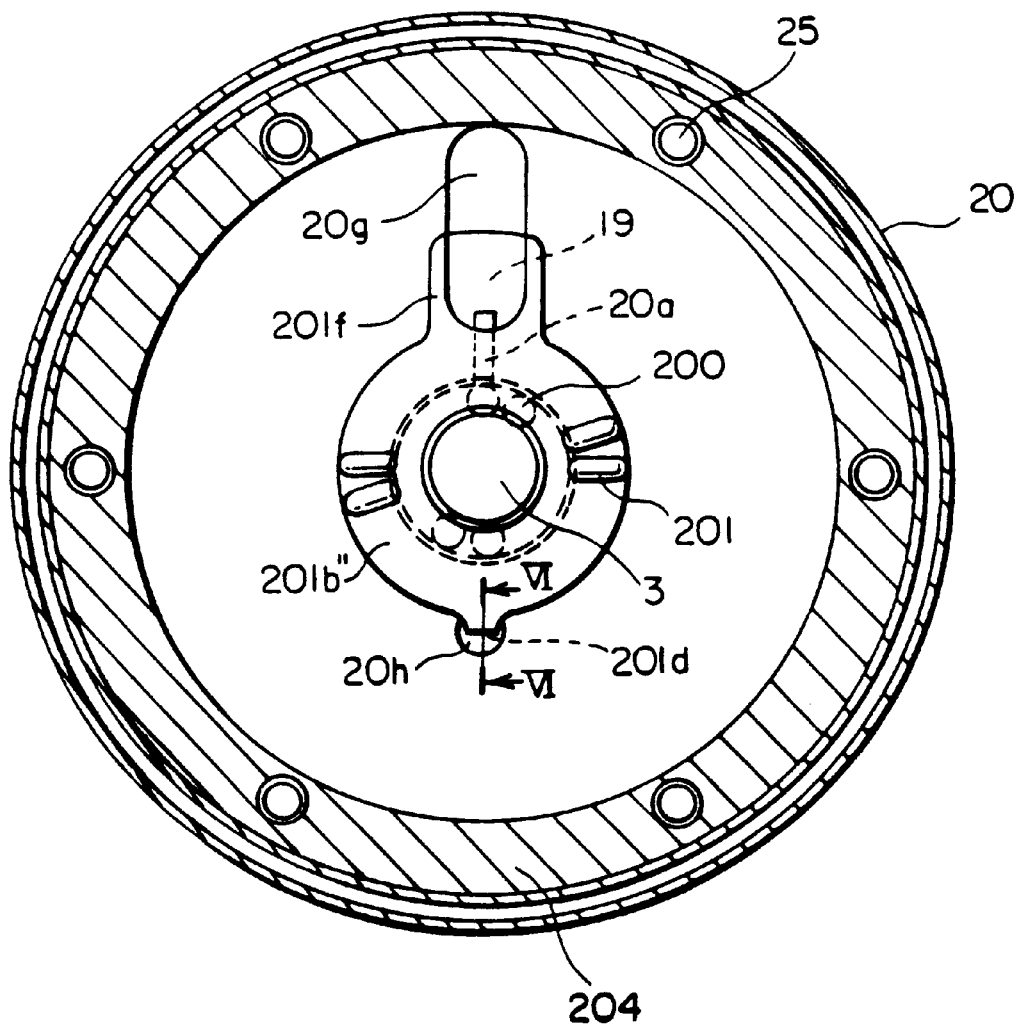
FIG. 5 is a vertical sectional view of a swash-plate compressor according to a second embodiment of this invention.
Figure 6:
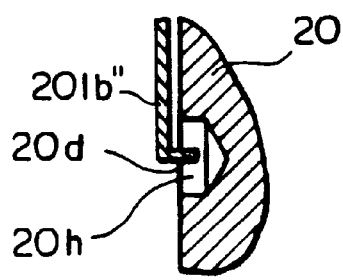
FIG. 6 is a sectional view taken along a line VI—VI in FIG. 5.

The swash-plate compressor shown in FIGS. 5 and 6 has a structure similar to FIGS. 2–4 except minor differences. Similar parts are designated by the same reference symbols as those in FIGS. 2–4 and description directed thereto is omitted. The differences will be described below.

A first thrust race 201b" has a flange portion 201f radially extending from a portion of its periphery edge to cover a portion of the oil receiving groove 20g to form the oil trapping portion 19. The first thrust race 201b" is also provided with a single finger portion 20d at a portion of its periphery edge diametrically opposite to the finger portion 21f. The finger portion 20d is loosely fitted in a fitting hole 20h formed in the bottom of the annular groove 204 to thereby prevent the rotation of the first thrust race 201b".

In the second embodiment of FIG. 5, the position of the oil receiving groove 20g is shown to be angularly displaced from that in the first embodiment shown in FIG. 3. It should be noted that the position of the oil receiving groove 20g can be selected to effectively collect the oil flowing into the inner surface of the front housing 20.

Although this invention has been described in connection with the variable capacity type wherein the slant angle of the swash plate is variable, it will be understood by those skilled in the art that this invention can be applicable to a fixed capacity type wherein the compressing capacity is not changed but is fixed.

Further, this invention has been illustrated relating to embodiments of a single piston head type which has the cylinder block, the piston portions and the cylinder head at one side of the swash plate. However, it will be understood by those skilled in the art that this invention can also be applicable to a both piston head type which has two cylinder blocks at opposite sides of the swash plate, respectively. Two piston portions are connected to opposite sides of the shoe receiving portion 52, respectively, and are fitted into the cylinder bores in the opposite cylinder blocks. Two cylinder heads are also mounted on the opposite cylinder blocks, respectively.

What is claimed is:

1. A swash-plate compressor comprising a compressor housing having a plurality of cylinder bores angularly spaced from each other about a axis and a crank chamber adjacent said cylinder bores, a drive shaft extending on said axis and rotatably supported by said compressor housing, a swash plate arranged within said crank chamber and attached to said drive shaft with an inclination angle to be rotated together with said drive shaft, a plurality of pistons slidably fitted in said cylinder bores, respectively, and a transmission member for converting a swinging motion of the swash plate into a linear reciprocal motion of said pistons, said compressor housing being provided with a shaft hole containing a radial bearing to rotatably support said drive shaft and an oil path communicating with said crank chamber and said shaft hole, a lubricating oil in said crank chamber being scraped by the rotation of said drive shaft and supplied through said oil path to said radial bearing, said compressor hosing being provided with an oil trapping means formed at an entrance of said oil path to receive said lubricating oil.

2. A swash-plate compressor as claimed in claim 1, wherein said compressor housing comprises a housing body of a generally cylindrical shape having said cylinder bores and a front housing fixed to said housing body to close one open end of said housing body, said swash plate being coupled to a rotor fixed to said drive shaft, said rotor being supported on an inner surface of said front housing through a thrust needle bearing unit, said thrust needle bearing unit comprising a first thrust race mounted on the inner surface of said front housing, a second thrust held at the side of said rotor, and bearing elements interposed between said first and said second thrust races, said front housing having an oil receiving groove formed in the inner surface thereof and extending in a radial direction, said oil trapping means being formed at a portion of said oil receiving groove.

3. A swash-plate compressor as claimed in claim 2, wherein said oil trapping means is formed by a part of said first thrust race and said oil receiving groove.

4. A swash-plate compressor as claimed in claim 2, wherein said oil trapping means is formed by a radially extended flange portion of said first thrust race.

5. A swash-plate compressor as claimed in claim 2, wherein said first thrust race has a plurality of finger portions formed at its peripheral edge and bent towards the inner surface of said front housing, said front housing being provided with a plurality of fitting holes formed in the inner surface thereof to receive said finger portions therein in one-to-one correspondence, said finger portions being fitted into said fitting holes to thereby inhibit the rotation of said first thrust race.

6. A swash-plate compressor as claimed in claim 5, wherein each of said finger portions has a width smaller than a diameter of said fitting hole, the length of said finger portion from a surface plane of said first thrust race to a top end of said finger portion being smaller than a depth of said fitting hole.

7. A swash-plate compressor as claimed in claim 2, wherein said rotor has a balancing member projecting therefrom towards the inner surface of said front housing, said front housing having an annular groove for permitting said rotor to rotate without interference between said balancing member and the inner surface of said front housing, said oil trapping means being disposed at a position equal to or outer than a moving track of said balancing member.

8. A swash plate compressor as claimed in claim 7, wherein said oil receiving groove is formed in a bottom surface of said annular groove.

9. A swash-plate compressor comprising a compressor housing having a plurality of cylinder bores angularly spaced from each other about a axis and a crank chamber adjacent said cylinder bores, a drive shaft extending on said axis and rotatably supported by said compressor housing, a swash plate arranged within said crank chamber and attached to said drive shaft with an inclination angle to be rotated together with said drive shaft, a plurality of single-headed pistons slidably fitted in said cylinder bores, respectively, and a plurality of pairs of shoe members which are slidably held by said single-headed pistons to clamp said swash plate and which serve to convert a swinging motion of the swash plate into a linear reciprocal motion of said single-headed pistons, said compressor housing being provided with a shaft hole containing a radial bearing to rotatably support said drive shaft and an oil path communicating with said crank chamber and said shaft hole, a lubricating oil in said crank chamber being scraped by the rotation of said drive shaft and supplied through said oil path to said radial bearing, said compressor housing being provided with an oil trapping means formed at an entrance of said oil path to receive said lubricating oil.

* * * * *